Oct. 10, 1933.                    E. TRACHSEL                    1,930,401
                              BRAKE ADJUSTING MEANS
                              Filed April 26, 1932
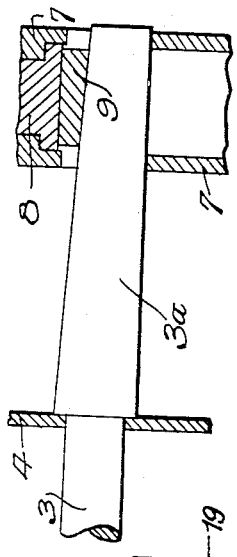
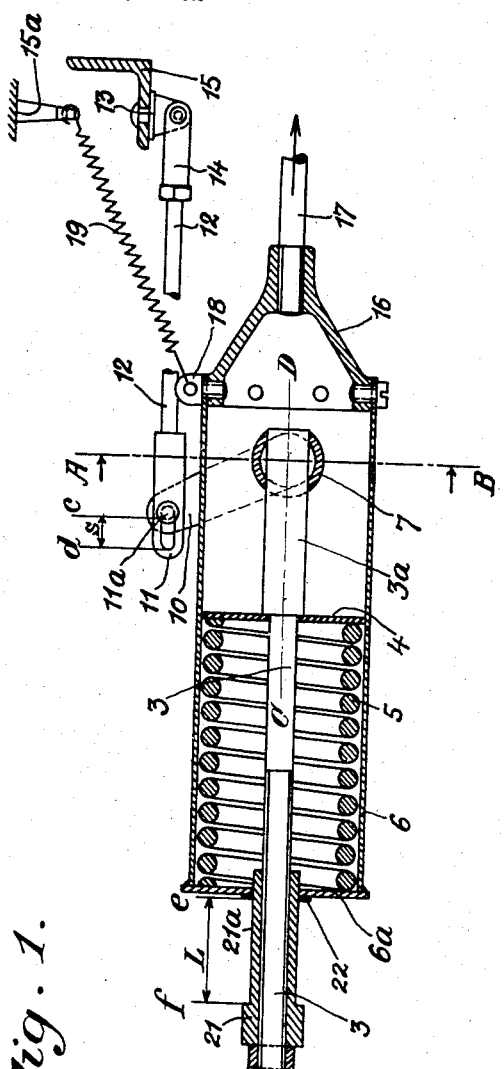
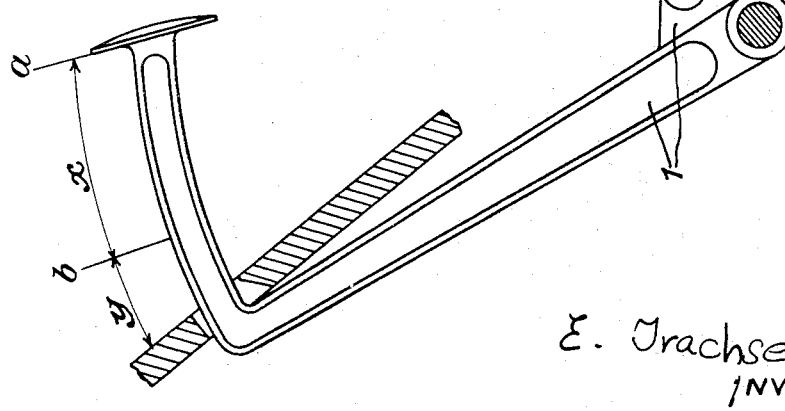
E. Trachsel
INVENTOR
By: Marks & Clerk
       ATTYS.

Patented Oct. 10, 1933

1,930,401

UNITED STATES PATENT OFFICE 1,930,401

BRAKE ADJUSTING MEANS

Ernst Trachsel, Zurich, Switzerland, assignor of one-half to Walther Hussy, Aarburg, Switzerland Application April 26, 1932, Serial No. 607,613, and in Germany May 18, 1931

2 Claims. (Cl. 188—196)

Automatic brake adjusting devices are known in which a spring which is interposed in the brake rodwork with initial stressing acts when becoming unstressed in a regulating manner on the brake rodwork, such that the brake shoes or brake bands have an approximately constant lifting distance, whereby when the brake pedal is depressed, the rodwork divided by the adjusting mechanism is drawn along, while when the pedal is released, the rodwork portion between the adjusting mechanism and the pedal is shortened. The adjustment is thus the result of two different operations and is effected through intermediate members. Such adjusting devices have the disadvantage that the actual adjustment takes place only on the brake pedal being released, while when the pedal is depressed continuously no such adjustment takes place and the object aimed at is not obtained.

In contradistinction thereto in the adjusting device according to the invention a spring is used in the form of a compression spring, which transmits the braking force from the brake operating lever to the brakes and the force of which is greater than the greatest forces to be transmitted by the brake rodwork and which is connected to a stop actuated clamping device for the direct automatic adjustment of the brake rodwork, so that the brake shoes or brake bands always have an approximately constant braking path and their adjustment takes place in a single operation.

Fig. 1 of the accompanying drawing shows in longitudinal section a constructional example of the arrangement according to the invention which is attached directly to the brake pedal. Fig. 2 shows the clamping device in cross-section on line A—B of Fig. 1. Fig. 3 is a horizontal section on the line C—D in Fig. 1.

The brake pedal 1 is pivotally connected to the forked head 2 which is screwed to the rod 3 and pinned to it. A spring 5 acts at one end against the piston plate 4 which bears against a shoulder on a wedge-shaped rod 3a and at the other end against the bottom 6a of the cylinder 6 which encloses the piston plate 4 and the spring 5. The force of the spring 5 is taken up by the transverse shaft 7 which is rigidly mounted in the cylinder 6 and through which the wedge-shaped bar 3a slidably extends and wedges itself between this shaft 7 and a wedge-shaped plate 9 adapted to be pressed against the bar by a pin 8 when the latter is turned in a counter-clockwise direction and to be released therefrom when the pin is turned in a clockwise direction. This plate 9 which is interposed between the wedge-shaped bar 3a and the threaded pin 8, enables the pressure exercised by the latter on the bar 3a to be distributed over a constant area irrespective of the angular position of said pin. The cover 20 closes the grease-filled space 7a of the hollow shaft 7. In the slotted forked head 11 there engages the pin 11a of the adjusting lever 10 which is rigidly connected to the threaded pin 8. The forked head 11 is connected by a rod 12 to a forked head 14 pivoted to the bearing pin 13. The fixed bearing pin 13 is riveted to the transverse member 15 of the chassis. The casing 16 is screwed to the cylinder 6 while the bar 17 which is screwed to the casing and is connected to the brakes transmits the forces coming from the brake pedal to the brakes. The spring 19 which is attached at one end to the screwed ring 18 on the cylinder and at the other end to the chassis 15a acts as a returning spring for the pedal in known manner. A nut 21 serves for tightening the spring 5 while its tubular extension 21a acts as a guide for the cylinder 6 and also protects the thread of the piston rod 3 from becoming dirtied and damaged. The sliding ring 22 on the tube 21a is hardened and when the spring 5 is being stressed reduces the frictional resistance between the nut 21 and the cylinder end 6a.

The automatic brake adjusting device operates as follows:

It is assumed that the brake lining is new and the distance of lift normal. Through repeated braking of the wheels the brake lining gradually becomes worn, which becomes noticeable through the brake pedal 1 having to be depressed more and more. When the pedal 1 in being depressed from $a$ to $b$ has passed through the distance $x$ the adjusting device or the pin 11a has also moved from $c$ to $d$ through the distance S, that is, the pin 11a comes up against a stop at $d$, namely the end of the slot in the forked head 11. Further wear on the brake lining necessitates the pedal 1 being depressed beyond $b$. As, however, the pin 11a is held fast, the adjusting lever 10 will turn in the clockwise direction and with it the threaded pin 8, whereby the latter is screwed outwardly and therefore released. As a result of this a gap will be formed between the wedge-shaped bar 3a and the threaded pin 8 and this gap affords a free adjusting space which varies according to the angular motion of the adjusting lever 10 and which is instantly taken up by the bar 3a due to the spring 5 causing the cylinder 6, and consequently the shaft 7, to move from e towards f until further movement thereof is prevented by the bar 3a again becoming wedged between the shaft 7 and the threaded pin 8. This will have caused the distance between the shaft 7 and the piston plate 4 to have become shortened by an amount proportional to the displacement with respect to one another of the perpendicular erected through the theoretical axes of the pins 7 and 11a. Hence the brakes can be tightened and adjusted by the action of the spring through the distance L corresponding to the distance y of the travel of the pedal. On the pedal 1 being released the brakes are released and the normal lift has again been established. The pin 11a also occupies its initial position, its displacement to the left having been compensated by the same adjustment distance, that is, by the same amount of turn of the threaded pin 8 to the right.

Through the repeated automatic adjustment of the brakes the brake lining will after a certain time become entirely worn down and the adjusting distance L have been completely used up. The cylinder end 6a or the sliding ring 22 will then bear against the nut 21 at f. The initial position of the adjusting device is reached again by the cylinder 6 being moved to the right by tightening the nut 21, thus stressing the spring 5. The brake lining is then replaced and the distance of lift adjusted to the normal amount, after which the above described mode of operation of the adjusting device can recommence.

What I claim is:

1. A brake adjusting mechanism for vehicles, comprising an axially movable cylinder, a compression spring enclosed in said cylinder, the force of said spring being greater than the greatest force to be transmitted, a brake rod adjustable under the action of said spring, a wedge-shaped bar controlling the adjusting movement of said brake rod, a threaded pin arranged at right angles to said wedge-shaped bar so as to be capable of acting thereon when turned in a counterclockwise direction and of being released therefrom when turned in a clockwise direction, an adjusting lever secured to said threaded pin, and a stop influencing said adjusting lever, as and for the purpose set forth.

2. A brake adjusting mechanism for vehicles, comprising an axially movable cylinder, a compression spring enclosed in said cylinder, the force of said spring being greater than the greatest force to be transmitted, a brake rod adjustable under the action of said spring, a wedge-shaped bar controlling the adjusting movement of said brake rod, a wedge-shaped plate cooperating with said bar, a threaded pin arranged at right angles to said bar so as to be capable of acting thereon when turned in a counterclockwise direction and of being released therefrom when turned in a clockwise direction, an adjusting lever secured to said threaded pin, and a stop member having a slot for influencing said adjusting lever, as and for the purpose set forth.

ERNST TRACHSEL.